US006732914B2

(12) United States Patent
Cadden et al.

(10) Patent No.: US 6,732,914 B2

(45) Date of Patent: May 11, 2004

(54) BRAZE SYSTEM AND METHOD FOR REDUCING STRAIN IN A BRAZE JOINT

(75) Inventors: Charles H. Cadden, Danville, CA (US); Steven H. Goods, Livermore, CA (US); Vincent C. Prantil, Wauwatosa, WI (US)

(73) Assignee: Sandia National Laboratories, Livermore, CA (US)

(*) Notice: Subject to any disclaimer, the term of this patent is extended or adjusted under 35 U.S.C. 154(b) by 138 days.

(21) Appl. No.: 10/112,792

(22) Filed: Mar. 28, 2002

(65) Prior Publication Data

US 2003/0234280 A1 Dec. 25, 2003

(51) Int. Cl.[7] .......................... B23K 35/12; B23K 21/02; C25D 7/04; B21D 39/00

(52) U.S. Cl. .................... 228/296; 228/245; 228/129.1; 228/121; 228/250; 228/253; 428/606; 428/607; 428/621

(58) Field of Search ......................... 228/250, 253–256, 228/245, 246, 120, 121, 122.1, 124.1, 124.5; 148/22–26; 428/606, 607, 621

(56) References Cited

U.S. PATENT DOCUMENTS 3,779,715 A * 12/1973 Wendler et al. ............. 428/568
4,770,953 A * 9/1988 Horiguchi et al. .......... 428/698
5,127,969 A * 7/1992 Sekhar ........................ 148/23
5,484,096 A * 1/1996 Tank .......................... 228/121
5,794,838 A * 8/1998 Ushikoshi et al. .......... 228/121
6,149,051 A * 11/2000 Vollmer et al. ........ 228/262.72
6,268,069 B1 * 7/2001 Ohashi et al. .............. 428/621
6,348,273 B1 * 2/2002 Ishikawa et al. ............ 428/621

FOREIGN PATENT DOCUMENTS

SU 1726182 A1 * 4/1992

* cited by examiner

*Primary Examiner*—Tom Dunn
*Assistant Examiner*—L. Edmondson
(74) *Attorney, Agent, or Firm*—Timothy P. Evans

(57) ABSTRACT

A system for joining a pair of structural members having widely differing coefficients of thermal expansion is disclosed. A mechanically "thick" foil is made by dispersing a refractory metal powder, such as molybdenum, niobium, tantalum, or tungsten into a quantity of a liquid, high expansion metal such as copper, silver, or gold, casting an ingot of the mixture, and then cutting sections of the ingot about 1 mm thick to provide the foil member. These foil members are shaped, and assembled between surfaces of structural members for joining, together with a layer of a braze alloy on either side of the foil member capable of wetting both the surfaces of the structural members and the foil. The assembled body is then heated to melt the braze alloy and join the assembled structure. The foil member subsequently absorbs the mechanical strain generated by the differential contraction of the cooling members that results from the difference in the coefficients of thermal expansion of the members.

11 Claims, 2 Drawing Sheets

Figure 2. Cross-section of $Al_2O_3$ joined to composite.

BRAZE SYSTEM AND METHOD FOR REDUCING STRAIN IN A BRAZE JOINT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

1. Field of the Invention

This invention relates to a ceramic-metal composite article and fabrication method therefor. In particular, the invention relates to a system comprising a composite braze joint structure for joining members having very dissimilar coefficients of thermal expansion. Furthermore, the present invention relates to a composite braze joint for joining a metal and a ceramic member.

2. Description of the Prior Art

A major problem in joining ceramics to metals is the thermal mismatch between the ceramic and metal materials. Thermal mismatch causes significant residual stress in the ceramic, leading to catastrophic failure of the joint. It is well known that to join materials having markedly different coefficients of thermal expansion and still provide a strong joint it is necessary to implement a means for reducing the strain which builds at the joint as the joined members cool. Ceramic-metal joints have used various joining methods, e.g. glass frit, diffusion bonding, brazing, and mechanical shrink fit, and various joint geometries, e.g. butt, conical, and cylindrical joint geometries.

One technique used is to join the materials at as low a temperature as possible. Active brazing alloy has heretofore been used for joining a ceramic member and a metallic member of a composite assembly. An example of such a composite assembly having been practically used, is a compression rotor for a turbocharger. The active brazing alloy is used exclusively with a view to increasing the strength at the joint between the ceramic member and the metallic member. In using such a brazing alloy, a reaction layer is formed between the brazing alloy and the ceramic member to firmly bond the same and thereby enable the ceramic member and the metallic member to be joined firmly. Further, among active brazing alloys, low melting point brazing alloys (solidus point is from 600° C. to 750° C.) such as In—Cu—Ag—Ti brazing alloy are used for joining the members of a mechanical part assembly for an automobile engine, with a view to reducing the difference in shrinkage (thermal distortion) between the ceramic and metallic members due to the difference in thermal expansion coefficient therebetween.

SUMMARY OF THE INVENTION

According to one aspect of the present invention, there is provided a brazing system for joining members, wherein at least one of which is a metallic member, and wherein another is a ceramic member.

It is an object of the present invention, therefore, to provide an brazing system for joining individual constituent members, wherein at least one of which is a metallic member and wherein another is a ceramic member, an itself providing a high strength joint in spite of large differences in coefficients of thermal expansion between the joined members.

It is yet another object of this invention to provide a means for overcoming large mechanical stress is caused by joining materials having large differences in coefficients of thermal expansion.

It is a further object of the present invention to provide a composite assembly which is joined by using a composite brazing alloy.

It is still another object of the present invention to provide a braze assembly which is capable of absorbing mechanical strain generated when joining materials having dissimilar thermal characteristics.

These and other objects will become evident to those having skill in these arts as the invention is described below.

DETAILED DESCRIPTION OF THE INVENTION

Figure 1:
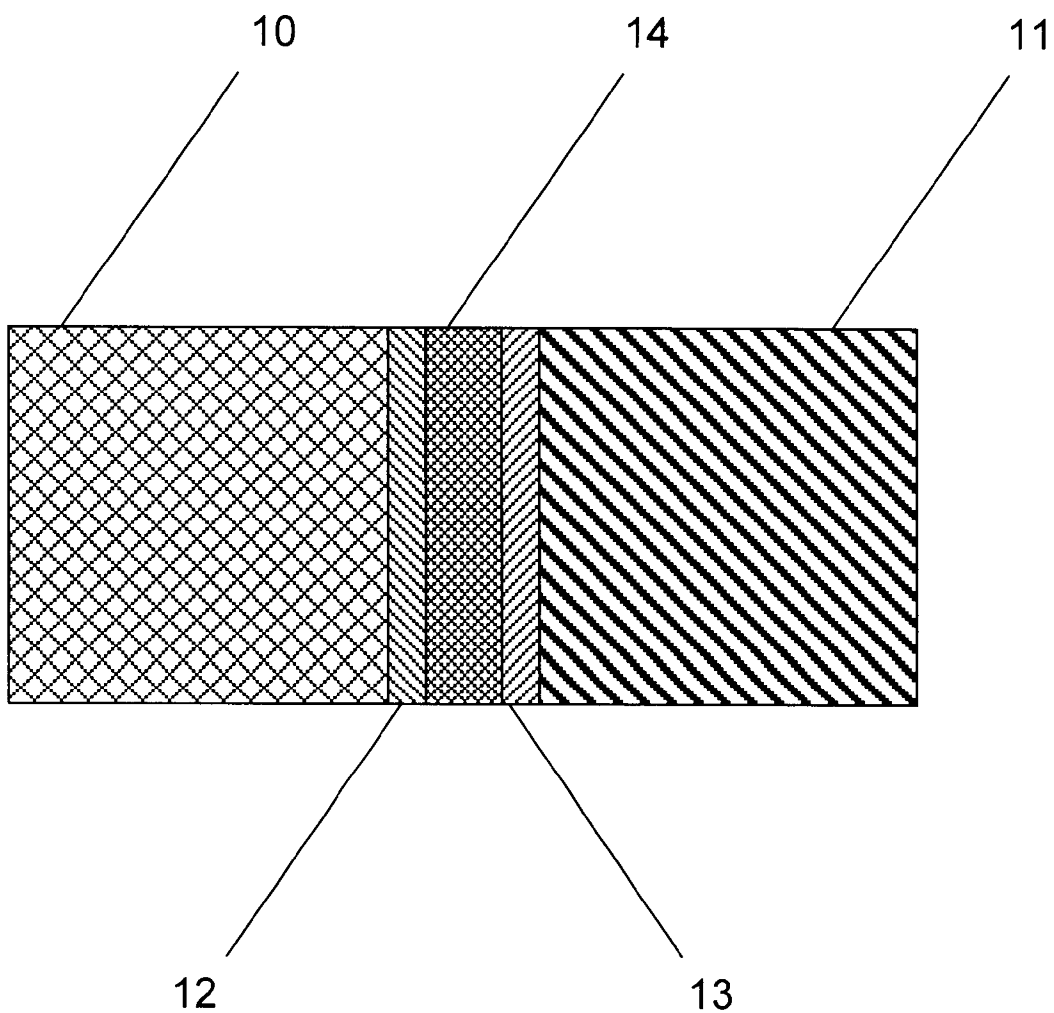
FIG. 1 shows a schematic illustration of the metallographic structure of the present invention.

As provided in the present invention the brazing system disclosed is used for joining materials which are traditionally known to present unique and difficult problems due to their widely differing thermal characteristics. In general, the group is comprised of metals and ceramics brazing a metal having a relatively large thermal expansion coefficient ($12\times10^{-6}/°$ C.), such as iron or carbon steel, or it may be a metal having a relatively small thermal expansion coefficient ($5\times10^{-6}/°$ C.) such as Incoloy, W, Fe-Ni42 alloy, Mo, Kovar, Invar, and the like.

Furthermore, as provided by the present invention the brazing system disclosed can be used for brazing a ceramic member such as 99% and 96% alumina (average thermal expansion coefficients of 5 and $6.4\times10^{-6}/°$ C. respectively up to about 300° C.), mullite ($6–7\times10^{-6}/°$ C.), rutile ($8.3\times10^{-6}/°$ C.), aluminum nitride ($4.5\times10^{-6}/°$ C.), silicon carbide ($4.8\times10^{-6}/°$ C.), and silicon nitride ( $2–3\times10^{-6}/°$ C.).

The brazing system disclosed herein comprises an intermediate foil structure itself comprising a metal matrix consisting essentially of a high stiffness, powdered refractory material dispersed throughout a lower melting, deformable host material. The disclosed foil structure is prepared by melting a small quantity of the low melting material and then mixing a larger quantity of a comminuted form of the refractory component, generally a fine powder (−325 US Screen Mesh), into the molten host material. An ingot or "pig" of this mixture to cast and allowed to cool. The resultant solid ingot consists of refractory first phase surrounded and dispersed in the ductile second phase. The foil structure is formed by rolling the ingot using conventional metallurgical rolling techniques, to form a bar or billet having a cross section of about 1 $cm^2$. Once formed, this intermediate structure is cut to size for the intended braze surface by EDM (electron discharge machining) or a similar process.

The finished foil structure functions as an intermediate layer in a composite brazed assembly wherein parts are joined to either side of the foil structure but the foil itself is not melted. Instead, the foil of the present invention forms an mechanically "thick" transition layer sandwiched between the joined parts such that the parts are each brazed to one side of the intermediate layer. Furthermore, the thickness of the layer is chosen such that the mechanical strain created by the differential volumetric changes arising when the assembly is cooled is absorbed by the ductile matrix of the foil structure. The end result is a braze assembly that behaves mechanically as if each part is brazed only to the intermediate foil layer and not to the part attached to the opposite side of that layer.

That is, neither of the parts "sees" the other as the brazed joint cools and contracts. Therefore, a low expansion part, "sees" a material closely matching its own coefficient of thermal expansion, while, in a similar manner, a high expansion part "sees" a ductile, deformable transition interface able to absorb the strain induced by the differential thermal expansion between itself and the intermediate layer. It was found that a foil thickness of about 1 mm or more was sufficient to provide the needed strain relief.

It is disclosed that the composite matrix used herein is powdered tungsten powder dispersed throughout a copper matrix. Furthermore, the volume fraction of tungsten is preferred to be about 65% to 95% by volume. Under these constrains the mass fraction of copper ranges from about 2.5% to about 20% by weight, with the remainder being tungsten powder. However, the more preferred weight fraction of copper is a range from about 5% to about 10%. It is therefore desirable that the content of copper in the composite be controlled in this range of copper content.

While the present invention is drawn specifically to a mixture of copper and tungsten other similar mixtures are expected to be as effective including, but not limited to, any of the mixtures comprising one or more refractory materials dispersed throughout a ductile, metal matrix, wherein the matrix comprises one or more relatively low melting materials. Useful refractory materials would include, besides tungsten, those materials generally having melting points over about 2500° C. such as, for example, the group of materials including boron, niobium, molybdenum, hafnium, tantalum, and various alloys of these materials. Various refractory compounds including nitrides, oxides, and carbides may or may not have utility in the present invention owning largely to their extreme hardness and metals such as rhenium, osmium and iridium, while refractory, would have be expected to have only limited real utility due to their economic scarcity. Finally, the zirconium also would be expected to have limited utility due to the pyrophoric nature of the powdered forms of this material.

Useful matrix metals besides copper, would include silver, gold, nickel, platinum, palladium, and alloys of two or more of these materials. Importantly, when preparing the composite material, close attention must be paid to the chemical stability of the combination of the refractory material in the liquid metal matrix material so as to avoid forming an alloy of these materials. Prudent selection of material combinations, as well as close control of preparation temperature and mixing time should prevent or greatly minimize dissolution of the refractory constituent into the matrix.

EXAMPLE

A braze joint utilizing the braze system of the present invention is shown schematically in FIG. 1 and was prepared as described below.

A wafer 14 comprising the intermediate composite material was prepared as described above using finely divided tungsten particles (−325 US Screen Mesh) dispersed into a quantity of copper. The intermediate composite was then cooled and formed into a billet from which wafers with a thickness of about 1 mm were cut. Wafer 14 was then sandwiched between layers 12 and 13 of an appropriate braze alloy and the ensemble sandwiched between a first test piece 10 of 94% alumina ceramic, and a second test piece 11 of INCONEL 625 nickel alloy. The entire assembly was then held together in a braze fixture (not shown) for alignment and to apply modest pressure to the parts (about >150 kPa). Layer 12 comprised a so-called "active" braze alloy consisting essentially of gold with 16% nickel, 1.75% vanadium, and 0.8% molybdenum. Layer 13 can be the same braze composition as layer 12 or a different braze composition of another conventional braze alloy.

The assembled fixture and test pieces were then placed in a vacuum retort furnace and heated to about 1000° C. within about 120 minutes to melt the braze alloy. The vacuum furnace was maintained at about 1000° C. for about another 5 minutes, after which the furnace was cooled to room temperature over a period of about 60 minutes.

Figure 2:
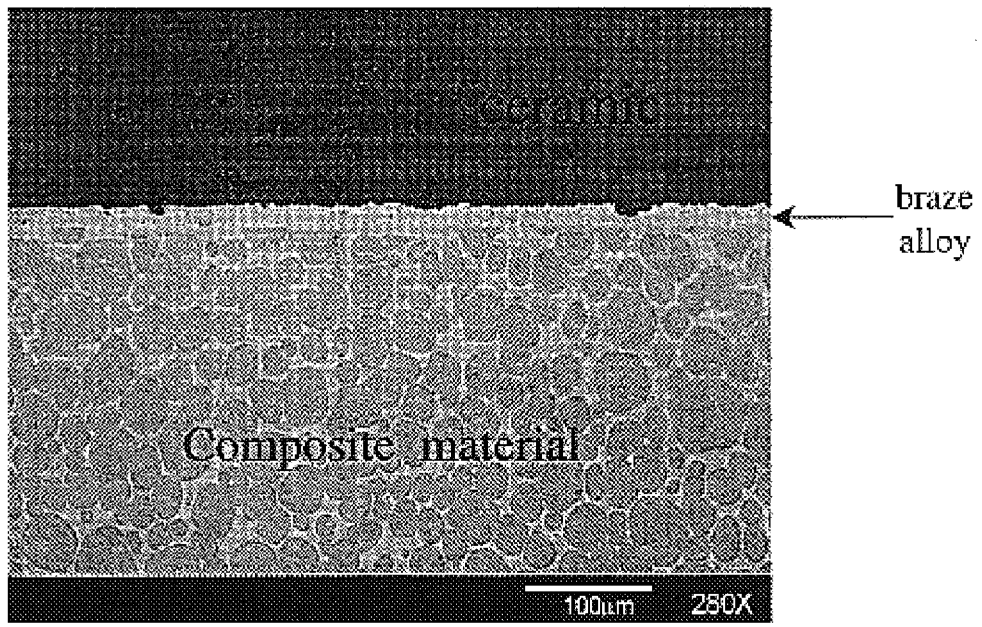
FIG. 2 shows a cross sectional photomicrograph of a portion of a braze joint prepared as described by this invention.

FIG. 2, shows a metallographic cross section of the structure of the brazing joint of this example. The photomicrograph shows the braze joint to be sound. The composite structure of the tungsten/copper intermediate layer is clearly evident.

What is claimed is:

1. A braze system for joining structural members having dissimilar coefficients of thermal expansion, comprising:

a foil member disposed between opposing surfaces of said structural members, wherein said foil member consisting essentially of:

tungsten uniformly distributed throughout a matrix of copper, said tungsten present in an amount equal to about 65% to about 95% by volume of said foil member;

generally parallel surfaces, and;

a thickness chosen to absorb a quantity of mechanical strain; and a quantity of braze material disposed between each of said surfaces of said foil member and said structural members.

2. The braze system of claim 1, wherein said copper is present in a weight fraction ranging between about 5% to about 10%.

3. The braze system of claim 2, wherein said tungsten is uniformly distributed throughout said composite material as a plurality of particles having a size distribution of less than about 40 microns in diameter.

4. The braze system of claim 1, wherein said foil member comprises a layer equal to about less than about 1 mm thick.

5. An intermediate braze member for joining structures having dissimilar coefficients of thermal expansion, comprising:

a foil member consisting essentially of tungsten uniformly distributed throughout a matrix of copper, wherein said tungsten is present in an amount equal to about 65% to about 95% by volume of said foil member, and wherein said foil member has a thickness chosen to absorb a quantity of mechanical strain.

6. The braze system of claim 5, wherein said copper is heated until it is a liquid, and wherein said tungsten is introduced into said liquid copper as a plurality of particles having a size distribution of less than about 40 microns in diameter and uniformly distributed throughout said liquid copper to form the foil member composite material.

7. The intermediate braze member of claim 6, wherein said copper is present in a weight fraction ranging between about 5% to about 10%.

8. The braze system of claim 5, wherein said foil member comprises a layer about to less than about 1 mm thick.

9. A method for brazing structures having dissimilar coefficients of thermal expansion, comprising the steps of:

providing a foil member consisting essentially of tungsten uniformly distributed throughout a matrix of copper, wherein said tungsten is present in an amount equal to about 65% to about 95% by volume of said foil member;

providing at least first and second mechanical structures to be joined by brazing;

providing a braze alloy capable of wetting surfaces of said foil member and said at least first and second structures;

sandwiching said foil member between said structures to be brazed such that a portion of said braze alloy is sandwiched between each of said at least first and second structures and a facing surface of said foil member thereby forming a braze assembly; and heating said braze assembly to a first temperature to melt said braze alloy.

10. The method of claim 9, wherein said copper is present in a weight fraction ranging between about 5% to about 10%.

11. The method of claim 10, wherein said copper is heated until it is a liquid, and wherein said tungsten is introduced into said liquid copper as a plurality of particles having a size distribution of less than about 40 microns in diameter and uniformly distributed throughout said liquid copper forming thereby the foil member composite material.

* * * * *